US012227293B2

(12) United States Patent
Parker et al.

(10) Patent No.: US 12,227,293 B2
(45) Date of Patent: Feb. 18, 2025

(54) ADJUSTABLE FRICTION SLIDER ASSEMBLY FOR PASSENGER SEAT

(71) Applicant: Safran Seats USA LLC, Gainesville, TX (US)

(72) Inventors: Charles Michael Parker, Irvine, CA (US); Foek Nguyen Le, Arlington, TX (US)

(73) Assignee: Safran Seats USA LLC, Gainesville, TX (US)

(*) Notice: Subject to any disclaimer, the term of this patent is extended or adjusted under 35 U.S.C. 154(b) by 263 days.

(21) Appl. No.: 17/926,003

(22) PCT Filed: May 29, 2020

(86) PCT No.: PCT/US2020/035348
§ 371 (c)(1),
(2) Date: Nov. 17, 2022

(87) PCT Pub. No.: WO2021/242261
PCT Pub. Date: Dec. 2, 2021

(65) Prior Publication Data
US 2023/0202659 A1     Jun. 29, 2023

(51) Int. Cl.
*B64D 11/00* (2006.01)
(52) U.S. Cl.
CPC .............. *B64D 11/00152* (2014.12)
(58) Field of Classification Search
CPC ........ B60N 2/826; B60N 2/821; B60N 2/829; B64D 11/0642; B64D 11/00152; B60R 2011/0084
See application file for complete search history.

(56) References Cited

U.S. PATENT DOCUMENTS

| 6,039,154 A | 3/2000 | Moll et al. | |
|---|---|---|---|
| 7,264,313 B2 * | 9/2007 | Clough | B60N 2/885 297/409 |

(Continued)

FOREIGN PATENT DOCUMENTS

| CN | 1180506 A | 5/1998 |
|---|---|---|
| CN | 102712448 A | 10/2012 |
| CN | 107444199 A | 12/2017 |

OTHER PUBLICATIONS

International Patent Application No. PCT/US2020/035348, International Search Report and Written Opinion, dated Mar. 2, 2021.

(Continued)

*Primary Examiner* — Bradley Duckworth
(74) *Attorney, Agent, or Firm* — Kilpatrick Townsend & Stockton LLP

(57) ABSTRACT

Described is an adjustable friction slider assembly having a rail member and a carriage assembly moveably coupled to the rail member, the carriage assembly having a bracket member and a plurality of roller elements moveably coupled to the rail member and coupled to the bracket member using a plurality of attachment members, the plurality of roller elements comprising at least one adjustable roller element coupled to the bracket member using a moveable attachment member, wherein moving the moveable attachment member adjusts a friction between the plurality of roller elements and the rail member.

20 Claims, 7 Drawing Sheets

(56) References Cited

U.S. PATENT DOCUMENTS

| | | | |
|---|---|---|---|
| 7,364,239 B2 * | 4/2008 | Clough | B60N 2/885 297/391 |
| 9,393,892 B1 | 7/2016 | Millan | |
| 10,538,185 B2 * | 1/2020 | Novin | F16C 29/02 |
| 2004/0007910 A1 | 1/2004 | Skelly | |
| 2013/0234490 A1 | 9/2013 | Millan | |
| 2016/0214513 A1 | 7/2016 | Millan | |
| 2018/0105087 A1 | 4/2018 | Novin | |

OTHER PUBLICATIONS

Chinese Application No. 202080101490.8, Office Action mailed on Apr. 30, 2024, 8 pages (6 pages of original document and 2 pages of English Translation).

European Application No. 20746420.7, Intention to Grant mailed on Jun. 17, 2024, 8 pages.

Chinese Application No. 202080101490.8, Office Action mailed on Sep. 27, 2024, 6 pages (4 pages of Original Document and 2 pages of English Translation).

* cited by examiner

ADJUSTABLE FRICTION SLIDER ASSEMBLY FOR PASSENGER SEAT

FIELD OF THE INVENTION

The field of the invention relates to a linear sliding mechanism for a passenger seat.

BACKGROUND

Passenger vehicles are incorporating an increasing number of adjustable features into the passenger seats of each passenger vehicle. For example, a passenger seat of an airplane may have sub-assemblies, such as a headrest or an in-flight entertainment system, adjustably attached to the passenger seat so that a passenger may move the headrest and/or the in-flight entertainment system to different suitable heights. Conventional linear sliding systems have been used to enable the movement of these sub-assemblies. However, many sub-assemblies have vastly different sizes and weights so that different individual linear sliding systems are needed to support the different sub-assemblies when they are in a static position. The need for different individual linear sliding systems adds additional costs in the design for manufacturing of precise "interference/friction fit" linear sliding systems that rely critically on tolerance stack-up to maintain performance with minimal maintenance over the lifetime of the linear sliding system.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, an adjustable friction slider assembly comprises: a rail member; and a carriage assembly moveably coupled to the rail member, the carriage assembly comprising: a bracket member; and a plurality of roller elements moveably coupled to the rail member and coupled to the bracket member using a plurality of attachment members, the plurality of roller elements comprising at least one adjustable roller element coupled to the bracket member using a moveable attachment member, wherein moving the moveable attachment member adjusts a friction between the plurality of roller elements and the rail member.

In some embodiments, the adjustable friction slider assembly further comprises a moveable sub-assembly coupled to the bracket member, wherein the friction is adjusted based on the moveable sub-assembly.

In certain embodiments, the moveable sub-assembly comprises a headrest, a video monitor, a tray table, or a portable electronic device holder.

The friction may comprise a static friction that causes the carriage assembly to maintain a position along the rail member.

In some embodiments, a moving force that overcomes the static friction is applied to the carriage assembly to move the carriage assembly along the rail member.

The rail member, in certain embodiments, comprises a longitudinal axis, and the at least one adjustable roller element is moveable in a direction substantially perpendicular to the longitudinal axis.

The carriage assembly, in some embodiments, further comprises a friction adjustment member coupled to the moveable attachment member and moving the friction adjustment member adjusts the friction between the plurality of roller elements and the rail member.

According to certain embodiments of the present invention, a passenger seat comprises an adjustable friction slider assembly comprising: a rail member coupled to the passenger seat; and a carriage assembly moveably coupled to the rail member, the carriage assembly comprising: a bracket member; and a plurality of roller elements moveably coupled to the rail member and coupled to the bracket member using a plurality of attachment members, the plurality of roller elements comprising at least one adjustable roller element coupled to the bracket member using a moveable attachment member, wherein moving the moveable attachment member adjusts a friction between the plurality of roller elements and the rail member.

The passenger seat may further comprise a moveable sub-assembly coupled to the bracket member, wherein the friction is adjusted based on the moveable sub-assembly.

In certain embodiments, the moveable sub-assembly comprises a headrest, a video monitor, a tray table, or a portable electronic device holder.

In some embodiments, the friction comprises a static friction that causes the carriage assembly to maintain a position along the rail member.

A moving force that overcomes the static friction may be applied to the carriage assembly to move the carriage assembly along the rail member.

The rail member, in some embodiments, comprises a longitudinal axis, and the at least one adjustable roller element is moveable in a direction substantially perpendicular to the longitudinal axis.

The carriage assembly, in certain embodiments, further comprises a friction adjustment member coupled to the moveable attachment member and moving the friction adjustment member adjusts the friction between the plurality of roller elements and the rail member.

According to certain embodiments of the present invention, a method for adjusting a friction of an adjustable friction slider assembly comprises: coupling a carriage assembly to a rail member, the carriage assembly comprising a plurality of roller elements, the plurality of roller elements comprising at least one adjustable roller element; and moving the at least one adjustable roller element relative to the rail member to adjust the friction between the plurality of roller elements and the rail member.

The friction may be adjusted based on a moveable sub-assembly coupled to the carriage assembly.

In certain embodiments, moving the at least one adjustable roller element comprises moving a moveable attachment member, and wherein the moveable attachment member couples the at least one adjustable roller element to the carriage assembly.

In some embodiments, moving the at least one adjustable roller element relative to the rail member comprises moving the at least one adjustable roller element in a direction substantially perpendicular to a longitudinal axis of the rail member.

The method may further comprise applying a moving force to the carriage assembly that overcomes a static friction between the carriage assembly and the rail member to move the carriage assembly along the rail member.

The method, in some embodiments, further comprises: removing the moving force from the carriage assembly; and maintaining the carriage assembly at a location along the rail member where the moving force is removed due to the static friction between the carriage assembly and the rail member.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide an adjustable friction slider assembly for passenger seats. While the adjustable friction slider assembly is discussed for use with aircraft seats, it is by no means so limited. Rather, embodiments of the adjustable friction slider assembly may be used in passenger seats or other seats of any type or otherwise as desired.

Figure 1A:
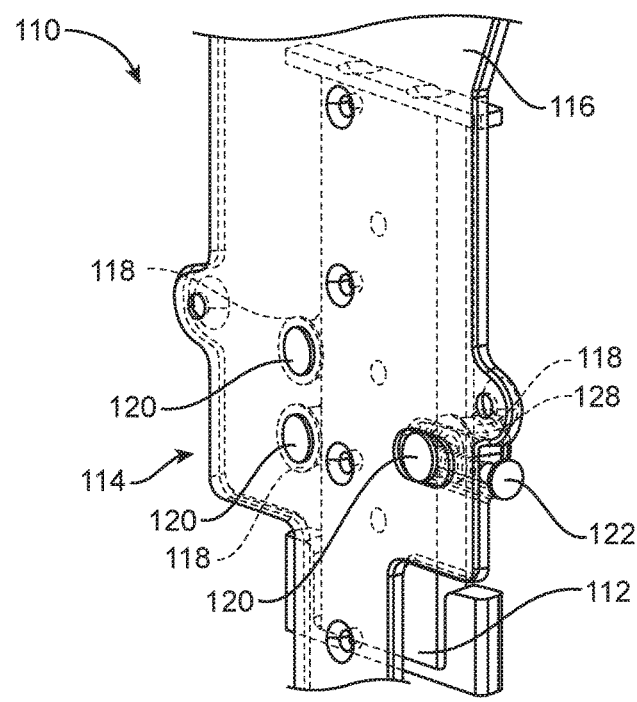
FIG. 1A is a front perspective view of an adjustable friction slider assembly, according to certain embodiments of the present invention.
Figure 1B:
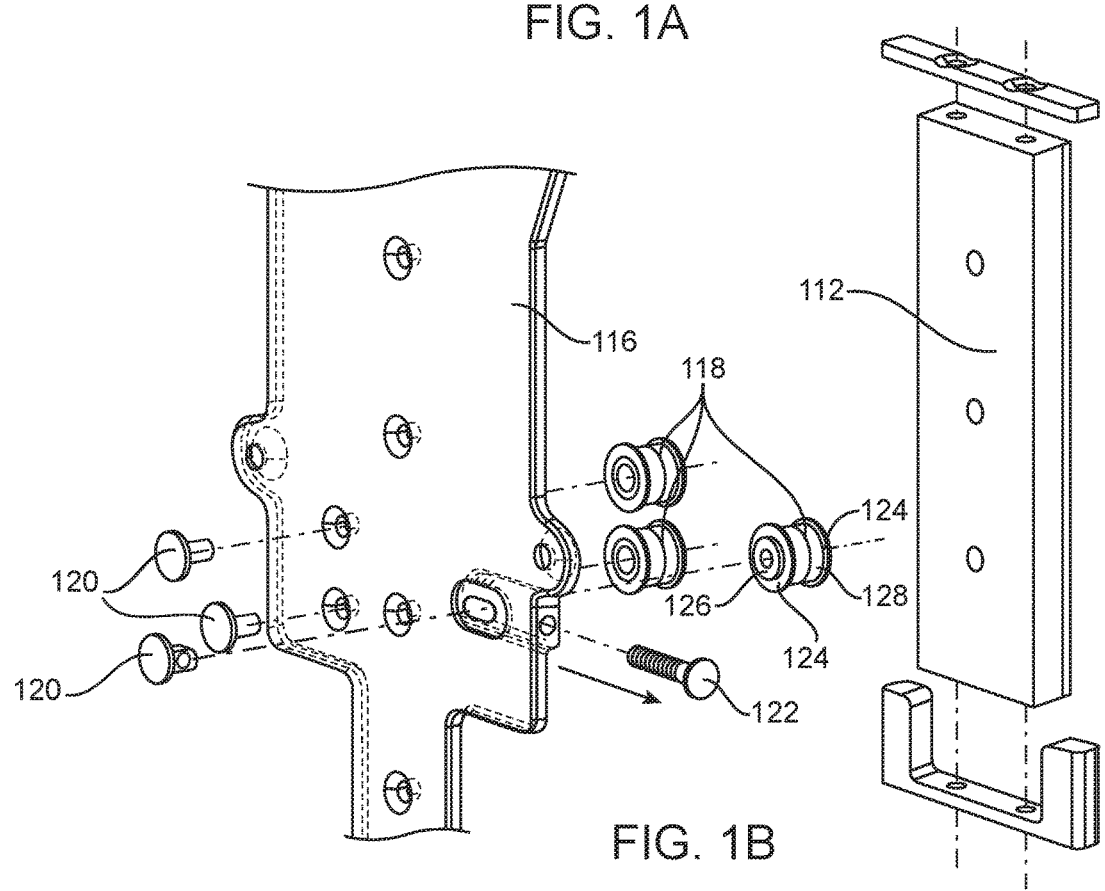
FIG. 1B is an exploded perspective view of the adjustable friction slider assembly of FIG. 1A.
Figure 1C:
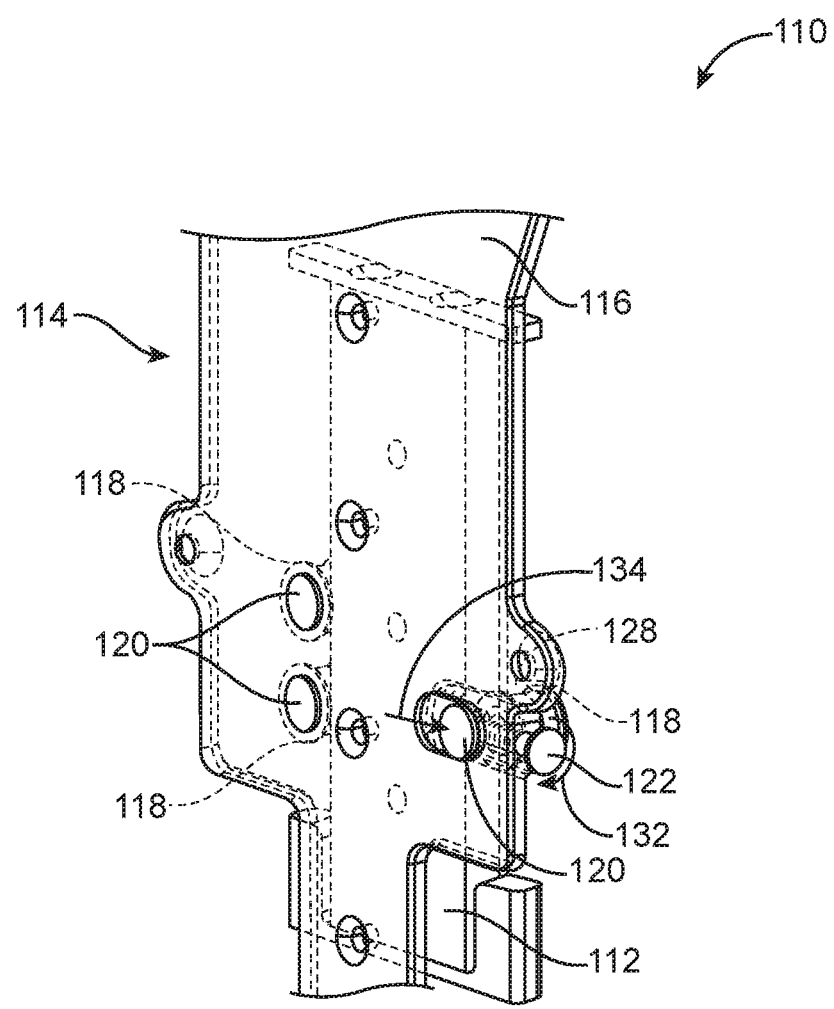
FIG. 1C is a front perspective view of the adjustable friction slider assembly of FIG. 1A with a movement of an adjustable roller element.

According to certain embodiments of the present invention, as best shown in FIGS. 1A-1C, an adjustable friction slider assembly 110 comprises a rail member 112 and a carriage assembly 114. The carriage assembly 114 comprises a bracket member 116 and at least one roller element 118. In some embodiments, the carriage assembly 114 may comprise at least one attachment member 120 and/or a friction adjustment member 122.

The adjustable friction slider assembly 110 and any component of the adjustable friction slider assembly 110 (e.g., the rail member 112, the carriage assembly 114, the bracket member 116, the at least one roller element 118, the at least one attachment member 120, or the friction adjustment member 122) may be formed of materials including but not limited to aluminum, stainless steel, aramid fibers, polycarbonate, polypropylene, other metallic materials, composite materials, or other similar materials. Due to the nature of the repetitive use of the adjustable friction slider assembly 110, the material(s) used to form the various components of the adjustable friction slider assembly 110 may be selected based on the wear resistance of the material (s). Additionally, each of the components of the adjustable friction slider assembly 110 may be formed of the same material, different materials, or any combination of the same or different materials.

The various components of the adjustable friction slider assembly 110 may each be any suitable shape. For example, the bracket member 116 may be circular, triangular, rectangular, square-shaped, oval-shaped, etc. The rail member 112 may be any suitable length and depth and may have any suitable cross-section, such as a rectangular cross-section, a square cross-section, a circular cross-section, an oval cross-section, a curved cross-section, a parabolic cross-section, etc.

In some embodiments, the carriage assembly 114 is moveably coupled to the rail member 112 so that the carriage assembly 114 may move along the length or longitudinal axis of the rail member 112. The at least one roller element 118 may be coupled to the bracket member 116 so that the at least one roller element 118 moveably couples the carriage assembly 114 to the rail member 112. The at least one roller element 118 may be a bearing, e.g., a roller bearing, circulating bearing wheel, etc., or any other suitable device having a low dynamic friction and a high static friction. Additionally, the at least one roller element 118 may include at least one flanged edge 124 that may assist with keeping the carriage assembly 114 coupled to the rail member 112. The at least one flanged edge 124 of the at least one roller element 118 may form a groove that enables the at least one roller element 118 to capture the rail member 112. In fact, the at least one roller element 118 may have any suitable cross-section that enables the at least one roller element 118 to be coupled with and securely capture the rail member 112.

The at least one roller element 118 may be coupled to the bracket member 116 of the carriage assembly 114. For example, at least one attachment member 120 may extend through at least one opening in the bracket member 116 and through at least one opening in each of the at least one roller elements 118 to attach each of the at least one roller elements 118 to the carriage assembly 114. The at least one attachment member 120 may be any suitable device for securing the at least one roller element 118 to the bracket member 116, e.g., a pin, a screw, a bolt, a nail, etc. Additionally, the at least one roller element 118 may include a spacer member 126 extending through the at least one roller element 118. The at least one attachment member 120 may extend through the spacer member 126. The spacer member 126 may then assist with securing the at least one roller element 118 to the at least one attachment member 120 while permitting the at least one roller element 118 to freely rotate relative to the at least one attachment member 120.

The carriage assembly 114 may include any suitable number of roller elements 118, e.g., one, two, three, four, five, six, seven, etc. In some embodiments, the number of attachment members 120 and spacer members 126 corresponds to the number of roller elements 118. Having at least three roller elements 118 as part of the carriage assembly 114 may restrict the number of degrees of freedom of the carriage assembly 114 to a single degree of freedom and thus fully constrain the carriage assembly 114. The single degree of freedom of the carriage assembly 114 may permit movement of the carriage assembly 114 along the longitudinal axis of the rail member 112.

In some embodiments, at least one of the roller elements 118 is an adjustable roller element 128. The adjustable roller element 128 may be coupled with the bracket member 116 using a moveable attachment member 120 so that the adjustable roller element 128 is moveable relative to the carriage assembly 114 and the rail member 112. For example, the adjustable roller element 128 may move in a direction substantially perpendicular to the longitudinal axis of the rail member 112.

Moving the adjustable roller element 128 may adjust the amount of friction between the roller elements 118 and the rail member 112. Moving the adjustable roller element 128 towards or away from the rail member 112 changes the amount of force applied to the rail member 112 by the adjustable roller element 128 and, as a result, any of the non-adjustable roller elements 118 that are part of the carriage assembly 114 as well. For example, moving the adjustable roller element 128 towards the rail member 112 increases the amount of force applied to the rail member 112 by the adjustable roller element 128 and the non-adjustable roller elements 118. Thus the friction, and more specifically the static friction, between the rail member 112 and the carriage assembly 114 increases.

In some embodiments, as best illustrated in FIG. 1C, the adjustable roller element 128 may be moved using the friction adjustment member 122. In some embodiments, the friction adjustment member 122 and the attachment member 120 extending through the adjustable roller element 128 may be a singular element or separate elements. For example, the friction adjustment member 122 may be a threaded pin, screw, compounding springs, a spring force actuator, any combination of these devices, or any other similar device that is coupled with the attachment member 120. Thus the amount of friction between the adjustable roller element 128, the roller elements 118, and the rail member 112 may be controlled by moving the friction adjustment member 122. For example, the friction adjustment member 122 may be rotated, as represented by arrow 132, which causes the adjustable roller element 128 to move towards or away from the rail member 112 and to adjust the friction between the carriage assembly 114 and the rail member 112. Arrow 134 represents movement of the attachment member 120 and the adjustable roller element 128 away from the rail member 112 due to the rotation of the friction adjustment member 122.

It should be understood that any number of the roller elements 118 may be an adjustable roller element 128. In fact, all of the roller elements 118 of the carriage assembly 114 may be adjustable roller elements 128. Increasing the number of adjustable roller elements 128 incorporated into the carriage assembly 114 may enable more fine-tuned and uniform adjustments of the friction between the carriage assembly 114 and the rail member 112.

Figure 2A:
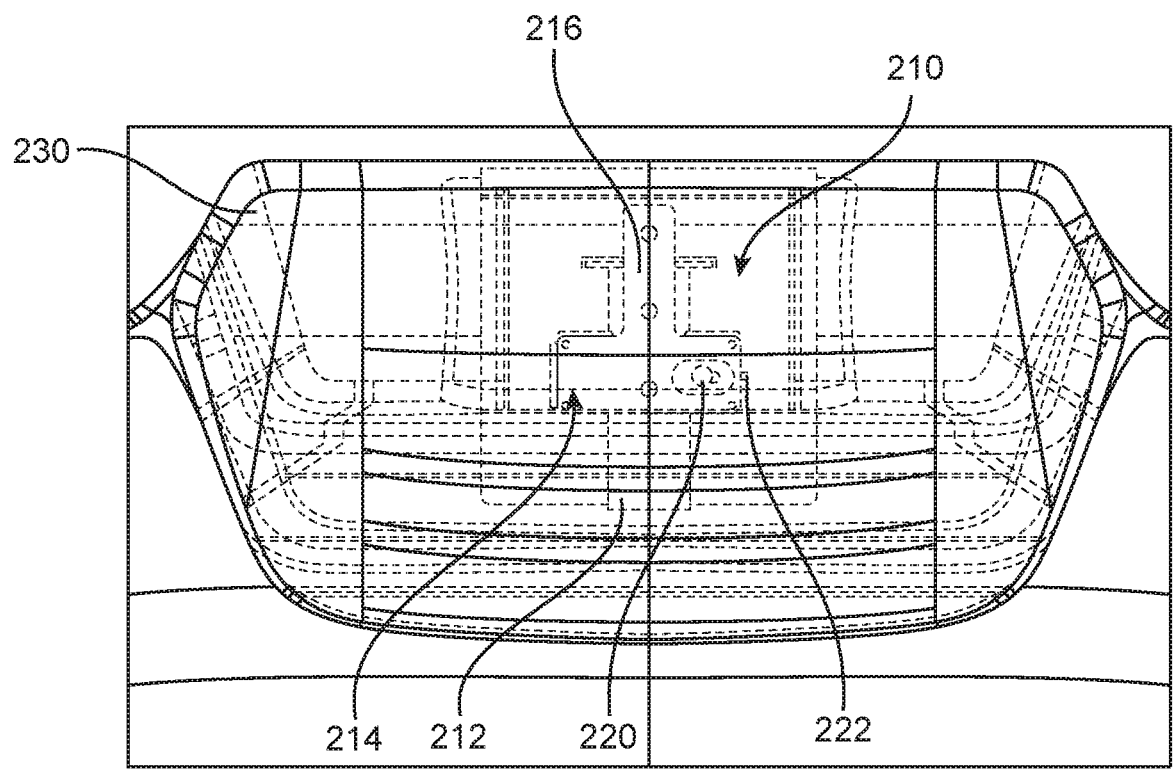
FIG. 2A is a front view of a headrest coupled to an adjustable friction slider assembly, according to certain embodiments of the present invention.
Figure 2B:
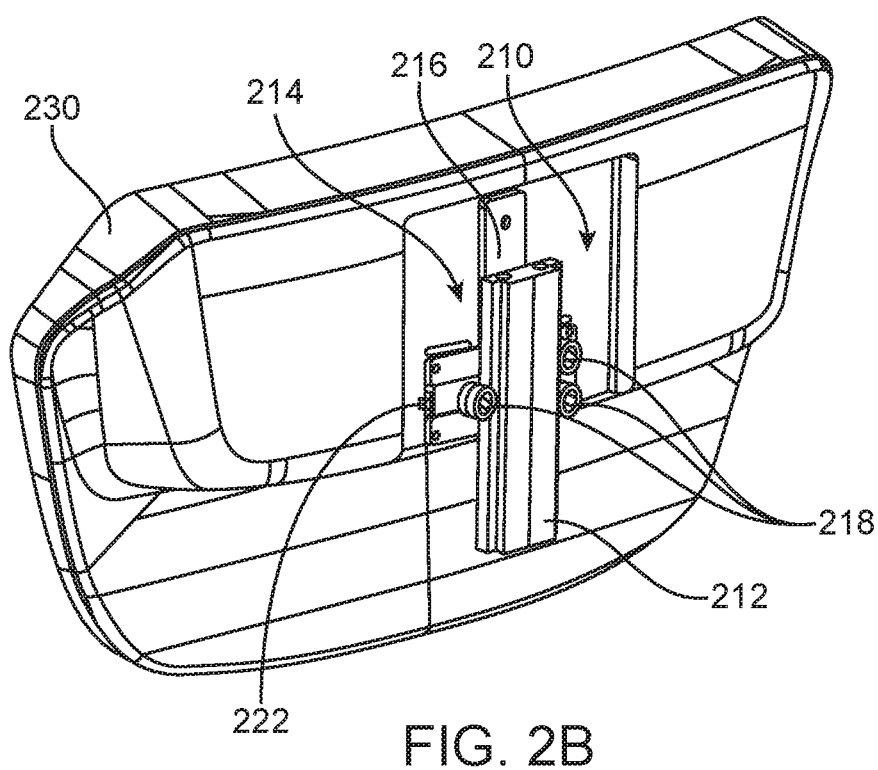
FIG. 2B is a rear perspective view of the headrest of FIG. 2A.

According to certain embodiments of the present invention, as best shown in FIGS. 2A-2B, an adjustable friction slider assembly 210 may be used to couple a sub-assembly 230 to a passenger seat. The adjustable friction slider assembly 210 may be the same or similar to the adjustable friction slider assembly 110 described above in reference to FIGS. 1A-1C. For example, the adjustable friction slider assembly 210 may comprise a rail member 212 and a carriage assembly 214 where the carriage assembly 214 may comprise a bracket member 216, at least one roller element 218, at least one attachment member 220, and/or a friction adjustment member 222. The various components of the adjustable friction slider assembly 210 may include any of the features described above in relation to FIGS. 1A-1C.

In some embodiments, the sub-assembly 230 may be a headrest, an in-flight entertainment or video monitor, a tray table, a portable electronic device holder, etc. The sub-assembly 230 is a headrest. The sub-assembly 230 may be coupled to the adjustable friction slider assembly 210. For example the sub-assembly 230 may be coupled to the bracket member 216 using any suitable form of chemical or mechanical attachment including, but not limited to, nuts and bolts, screws, pins and rivets, a snap-fit connection, a friction fit connection, adhesive, welding, other mechanical fasteners, and/or other chemical fasteners.

The sub-assembly 230 may be coupled directly or indirectly to the bracket member 216. In some embodiments, the sub-assembly 230 may be coupled to an intermediate member that is then attached to the bracket member 216. The intermediate member may assist with restricting any movement of the sub-assembly 230 relative to the bracket member 216 or the intermediate member may permit pivoting of the sub-assembly 230 relative to the bracket member 216. Permitting pivoting of the sub-assembly 230 relative to the bracket member 216 may enable a passenger to adjust the angle of the sub-assembly 230.

Figure 3A:
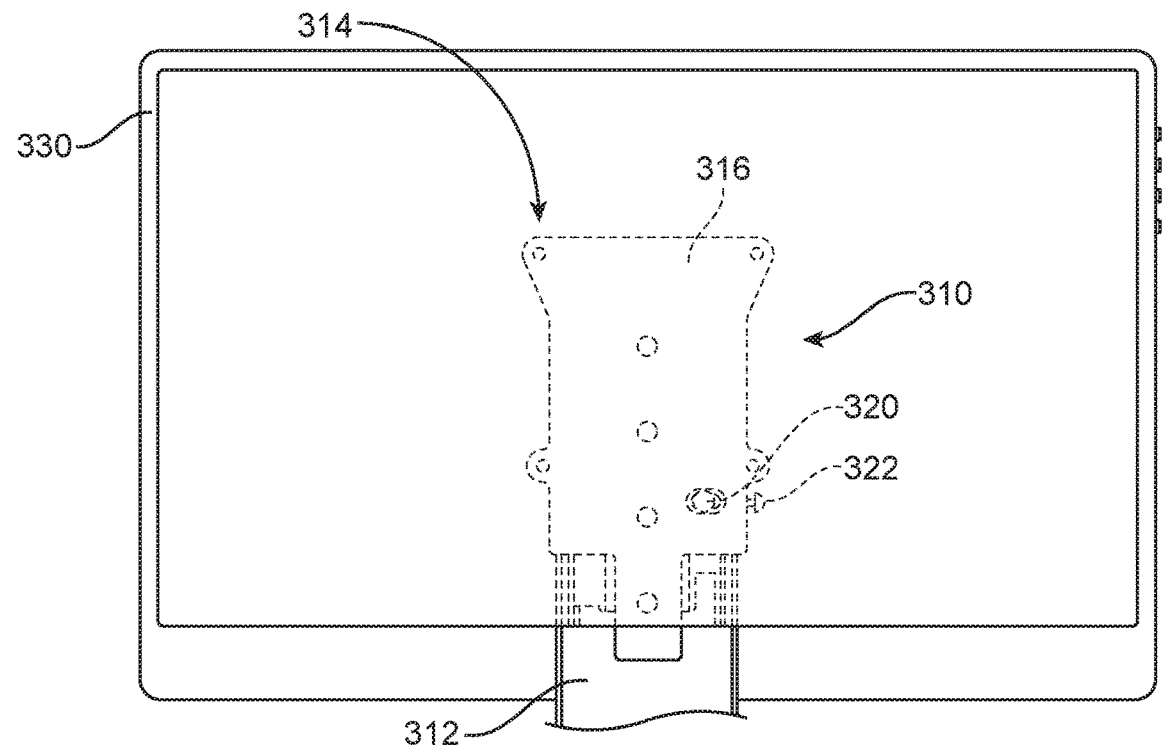
FIG. 3A is a front view of an in-flight entertainment monitor coupled to an adjustable friction slider assembly, according to certain embodiments of the present invention.
Figure 3B:
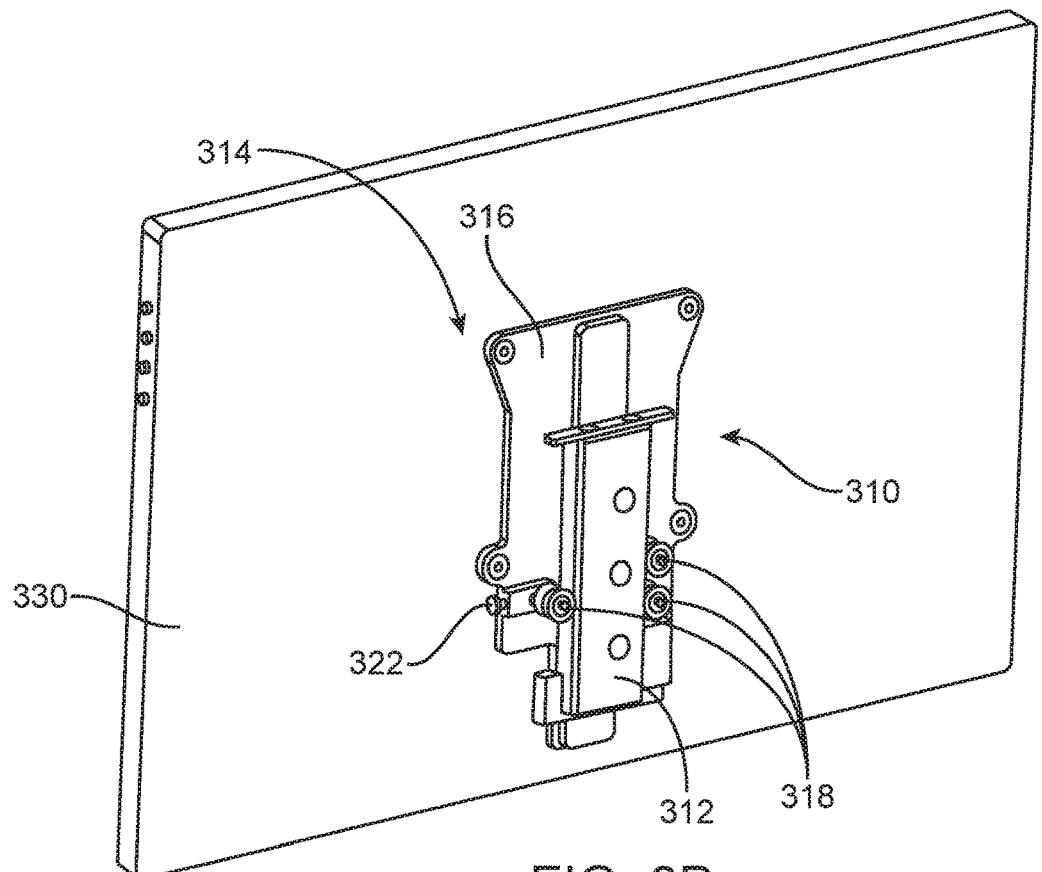
FIG. 3B is a rear perspective view of the in-flight entertainment monitor of FIG. 3A.

According to certain embodiments of the present invention, as best shown in FIGS. 3A-3B, an adjustable friction slider assembly 310 may be used to couple a sub-assembly 330 to a passenger seat. The sub-assembly 330 shown is an in-flight entertainment monitor. The adjustable friction slider assembly 310 may be the same or similar to the adjustable friction slider assembly 110, 210 described above in reference to FIGS. 1A-2B. For example, the adjustable friction slider assembly 310 may comprise a rail member 312 and a carriage assembly 314 where the carriage assembly 314 may comprise a bracket member 316, at least one roller element 318, at least one attachment member 320, and/or a friction adjustment member 322. The various components of the adjustable friction slider assembly 310 may include any of the features described above in relation to FIGS. 1A-2B.

Figure 4A:
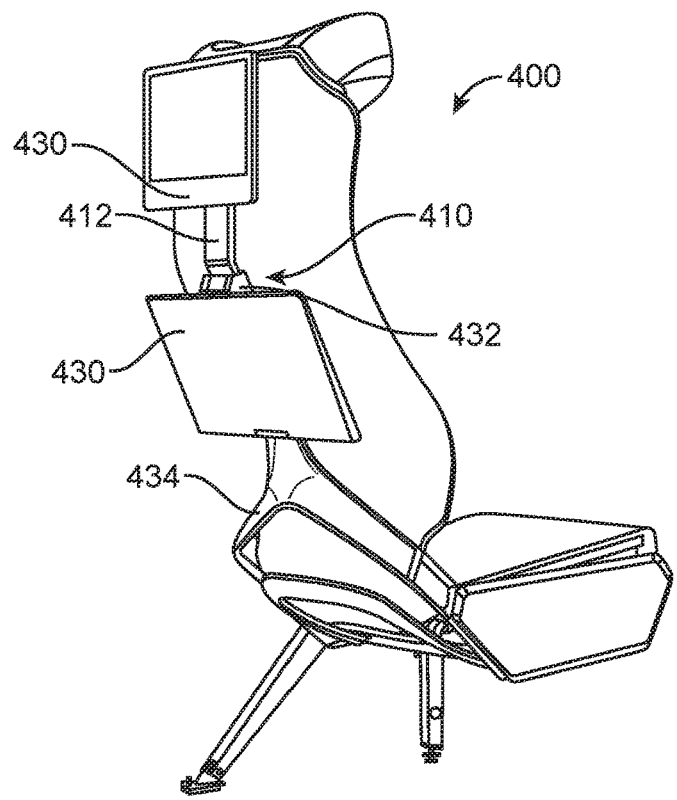
FIG. 4A is a rear perspective view of a passenger seat incorporating adjustable friction slider assemblies, according to certain embodiments of the present invention.
Figure 4B:
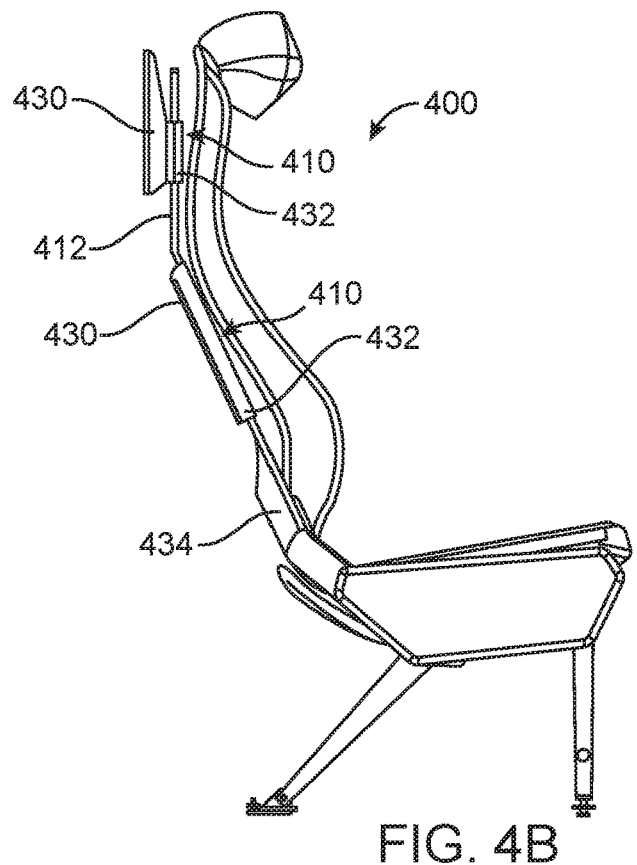
FIG. 4B is a right side view of the passenger seat of FIG. 4A.

According to certain embodiments of the present invention, as best shown in FIGS. 4A-4B, an adjustable friction slider assembly 410 may be used to couple a sub-assembly 430 to a passenger seat 400. The adjustable friction slider assembly 410 may be the same or similar to the adjustable friction slider assembly 110, 210, 310 described above in reference to FIGS. 1A-3B and the sub-assembly 430 may be the same or similar to the sub-assembly 230, 330 described above in reference to FIGS. 2A-3B. For example, the adjustable friction slider assembly 410 may comprise a rail member 412 and a carriage assembly where the carriage assembly may comprise a bracket member, at least one roller element, at least one attachment member, and/or a friction adjustment member. The various components of the adjustable friction slider assembly 410 may include any of the features described above in relation to FIGS. 1A-3B.

In some embodiments, the adjustable friction slider assembly 410 may be housed in an outer casing 432 that at least partially or wholly encloses the adjustable friction slider assembly 410. The outer casing 432 may protect the adjustable friction slider assembly 410 from damage and prevent tampering with the adjustable friction slider assembly 410. The outer casing 432 may also provide a more seamless and finished aesthetic to the adjustable friction slider assembly 410. Additionally, the rail member 412 may be part of or integrally formed with a seat back shroud 434 or the rail member 412 may be a discrete element that extends at least partially into a seat back or other portion of a passenger seat 400.

Figure 5:
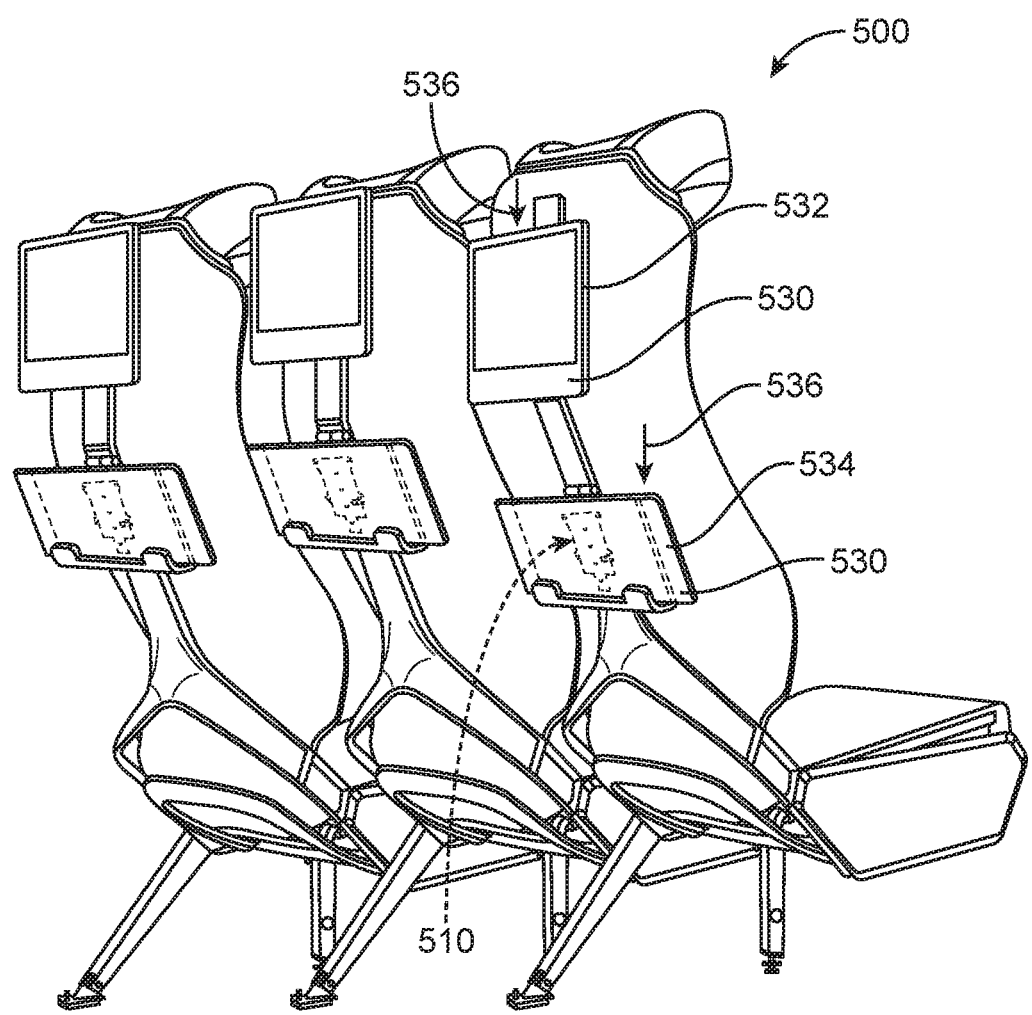
FIG. 5 is a rear perspective view of a row of passenger seats incorporating adjustable friction slider assemblies, according to certain embodiments of the present invention.

According to certain embodiments of the present invention, as best shown in FIG. 5, an adjustable friction slider assembly 510 may be used to couple a sub-assembly 530 to a passenger seat 500. The adjustable friction slider assembly 510 may be the same or similar to the adjustable friction slider assembly 110, 210, 310, 410 described above in reference to FIGS. 1A-4B and the sub-assembly 530 may be the same or similar to the sub-assembly 230, 330, 430 described above in reference to FIGS. 2A-4B. For example, the adjustable friction slider assembly 510 may comprise a rail member and a carriage assembly where the carriage assembly may comprise a bracket member, at least one roller element, at least one attachment member, and/or a friction adjustment member. The various components of the adjustable friction slider assembly 510 may include any of the features described above in relation to FIGS. 1A-4B.

The same adjustable friction slider assembly 510 may be used regardless of the type of sub-assembly 530 being used. For example, the same adjustable friction slider assembly 510 may be used to attach both the in-flight entertainment monitor 532 and the personal electronic device holder 534 to the passenger seat 500 because of the adjustability of the friction of the adjustable friction slider assembly 510.

As described above in reference to FIGS. 1A-1C, the carriage assembly of each adjustable friction slider assembly 510 is coupled to the rail member and the adjustable roller element is moved towards or away from the rail member to adjust the amount of force the carriage assembly applies against the rail member. The adjustable friction slider assembly 510 used to attach the in-flight entertainment monitor 532 and the adjustable friction slider assembly 510 used to attach the personal electronic device holder 534 may each be adjusted to create different amounts of friction in the respective adjustable friction slider assembly 510.

The adjustment of the adjustable roller element may be based on the amount of force necessary to create sufficient static friction to hold the adjustable friction slider assembly 510 in a stationary position supporting the sub-assembly 530 while having a relatively low dynamic friction that permits a smooth movement of the adjustable friction slider assembly 510 along the rail member. The amount of friction necessary for an in-flight entertainment monitor versus a personal electronic device holder or any other sub-assembly will be different and will largely depend on the size and weight of the sub-assembly 530. In some embodiments, the manufacturer or installer of the passenger seat 500 may move the adjustable roller element of each adjustable friction slider assembly 510 to create the necessary amount of friction for the respective sub-assembly 530 that each adjustable friction slider assembly 510 supports.

In some embodiments, the carriage member may be permitted to slide along the rail member after the friction is set by the adjustable roller element. For example, a downward force, represented by arrows 536, may be applied to each sub-assembly 530. When the downward force is enough to overcome the static friction of the respective adjustable friction slider assemblies 510, the dynamic friction between the carriage assembly and the rail member permits a smooth movement of the carriage assembly along the rail member. It should be understood that an upward force may also be applied to each sub-assembly 530 to cause the sub-assemblies 530 to move.

After the downward force is removed, the static friction between the carriage assembly and the rail member once again causes the adjustable friction slider assembly 510 to maintain a stationary position. So a user may adjust a position of the sub-assembly 530 relative to the rail member by applying a force to the sub-assembly 530 or in some cases by applying a force directly to the adjustable friction slider assembly 510. Once the sub-assembly 530 is at the new location, the user may stop applying the force. The sub-assembly 530 will then remain at the new location due to the static friction created by the adjustable friction slider assembly 510.

Using the adjustable friction slider assembly 510 may reduce the cost of manufacturing the passenger seat 500 and increase the interchangeability of the various types of sub-assemblies due to the need for only a single design of the adjustable friction slider assembly 510 regardless of the type of sub-assembly used. This may lead to easier customization of the passenger seats 500 because the sub-assemblies may be removed and replaced without the need to replace the adjustable friction slider assembly 510.

Figure 6:
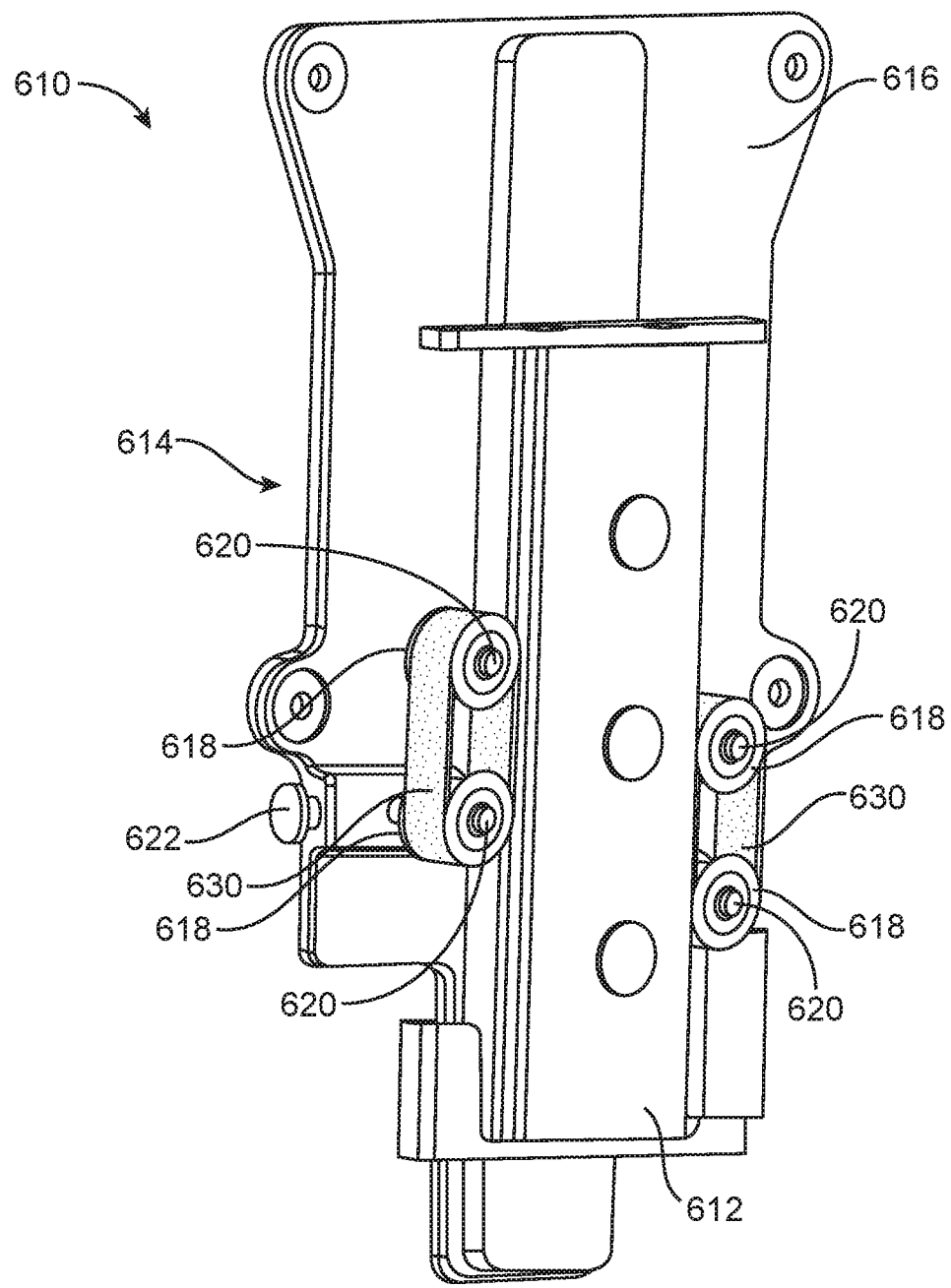
FIG. 6 is a rear perspective view of an adjustable friction slider assembly incorporating elastic belts, according to certain embodiments of the present invention.

According to certain embodiments of the present invention, as best shown in FIG. 6, an adjustable friction slider assembly 610 may incorporate at least one elastic band 630. The adjustable friction slider assembly 610 may be the same or similar to the adjustable friction slider assembly 110, 210, 310, 410, 510 described above in reference to FIGS. 1A-5. For example, the adjustable friction slider assembly 610 may comprise a rail member 612 and a carriage assembly 614 where the carriage assembly 614 may comprise a bracket member 616, at least one roller element 618, at least one attachment member 620, and/or a friction adjustment member 622. The various components of the adjustable friction slider assembly 610 may include any of the features described above in relation to FIGS. 1A-1C.

In some embodiments, the at least one elastic band 630 may be positioned around the at least one roller element 618. Positioning the at least one elastic band 630 around the at least one roller element 618 may increase the static friction as well as the dynamic friction of the adjustable friction slider assembly 610. The at least one elastic band 630 may be positioned around the at least one roller element 618 so that at least one portion of the at least one elastic band 630 is positioned at least partially between the at least one roller element 618 and the rail member 612. As the carriage assembly 614 moves along the rail member 612, the at least one elastic band 630 moves with the at least one roller element 618.

The adjustable friction slider assembly 610 may include a plurality of roller elements 618 positioned on multiple sides of the rail member 612. An elastic band 630 may be positioned around each set of roller elements 618 arranged linearly in the longitudinal direction of the rail member 612.

For example, two roller elements 618 may be linearly aligned on a left side of the rail member 612 and two separate roller elements 618 may be linearly aligned on a right side of the rail member 612. One elastic band 630 may be positioned around each set of roller elements 618 so that at least a portion of each elastic band 630 is positioned between each respective roller element 618 and the rail member 612.

Positioning the at least one portion of the at least one elastic band 630 between the at least one roller element 618 and the rail member 612 may help to dampen any sound created as the at least one roller element 618 moves along the rail member 612, may assist in maintaining constant friction, and thus minimizing slippage, between the carriage assembly 614 and the rail member 612, and may minimize wear on the at least one roller element 618 and the rail member 612.

Elements of any of the embodiments discussed above may be fully interchangeable with one another. In the following, further examples are described to facilitate the understanding of the invention (and in some aspects, features of an apparatus or system described in one or more of these examples can be utilized in a method described in one of the other examples or vice versa):

Example 1. An adjustable friction slider assembly (which may incorporate features of any of the subsequent examples) comprising: a rail member; and a carriage assembly moveably coupled to the rail member, the carriage assembly comprising: a bracket member; and a plurality of roller elements moveably coupled to the rail member and coupled to the bracket member using a plurality of attachment members, the plurality of roller elements comprising at least one adjustable roller element coupled to the bracket member using a moveable attachment member, wherein moving the moveable attachment member adjusts a friction between the plurality of roller elements and the rail member.

Example 2. The adjustable friction slider assembly of Example 1 or any of the preceding or subsequent examples, further comprising a moveable sub-assembly coupled to the bracket member, wherein the friction is adjusted based on the moveable sub-assembly.

Example 3. The adjustable friction slider assembly of Example 2 or any of the preceding or subsequent examples, wherein the moveable sub-assembly comprises a headrest, a video monitor, a tray table, or a portable electronic device holder.

Example 4. The adjustable friction slider assembly of Example 1 or any of the preceding or subsequent examples, wherein the friction comprises a static friction that causes the carriage assembly to maintain a position along the rail member.

Example 5. The adjustable friction slider assembly of Example 4 or any of the preceding or subsequent examples, wherein a moving force that overcomes the static friction is applied to the carriage assembly to move the carriage assembly along the rail member.

Example 6. The adjustable friction slider assembly of Example 1 or any of the preceding or subsequent examples, wherein the rail member comprises a longitudinal axis, and the at least one adjustable roller element is moveable in a direction substantially perpendicular to the longitudinal axis.

Example 7. The adjustable friction slider assembly of Example 1 or any of the preceding or subsequent examples, wherein the carriage assembly further comprises a friction adjustment member coupled to the moveable attachment member and moving the friction adjustment member adjusts the friction between the plurality of roller elements and the rail member.

Example 8. A passenger seat (which may incorporate features of any of the preceding or subsequent examples) comprising an adjustable friction slider assembly comprising: a rail member coupled to the passenger seat; and a carriage assembly moveably coupled to the rail member, the carriage assembly comprising: a bracket member; and a plurality of roller elements moveably coupled to the rail member and coupled to the bracket member using a plurality of attachment members, the plurality of roller elements comprising at least one adjustable roller element coupled to the bracket member using a moveable attachment member, wherein moving the moveable attachment member adjusts a friction between the plurality of roller elements and the rail member.

Example 9. The passenger seat of Example 8 or any of the preceding or subsequent examples, further comprising a moveable sub-assembly coupled to the bracket member, wherein the friction is adjusted based on the moveable sub-assembly.

Example 10. The passenger seat of Example 9 or any of the preceding or subsequent examples, wherein the moveable sub-assembly comprises a headrest, a video monitor, a tray table, or a portable electronic device holder.

Example 11. The passenger seat of Example 8 or any of the preceding or subsequent examples, wherein the friction comprises a static friction that causes the carriage assembly to maintain a position along the rail member.

Example 12. The passenger seat of Example 11 or any of the preceding or subsequent examples, wherein a moving force that overcomes the static friction is applied to the carriage assembly to move the carriage assembly along the rail member.

Example 13. The passenger seat of Example 8 or any of the preceding or subsequent examples, wherein the rail member comprises a longitudinal axis, and the at least one adjustable roller element is moveable in a direction substantially perpendicular to the longitudinal axis.

Example 14. The passenger seat of Example 8 or any of the preceding or subsequent examples, wherein the carriage assembly further comprises a friction adjustment member coupled to the moveable attachment member and moving the friction adjustment member adjusts the friction between the plurality of roller elements and the rail member.

Example 15. A method (which may incorporate features of any of the preceding or subsequent examples) for adjusting a friction of an adjustable friction slider assembly comprising: coupling a carriage assembly to a rail member, the carriage assembly comprising a plurality of roller elements, the plurality of roller elements comprising at least one adjustable roller element; and moving the at least one adjustable roller element relative to the rail member to adjust the friction between the plurality of roller elements and the rail member.

Example 16. The method of Example 15 or any of the preceding or subsequent examples, wherein the friction is adjusted based on a moveable sub-assembly coupled to the carriage assembly.

Example 17. The method of Example 15 or any of the preceding or subsequent examples, wherein moving the at least one adjustable roller element comprises moving a moveable attachment member, and wherein the moveable attachment member couples the at least one adjustable roller element to the carriage assembly.

Example 18. The method of Example 15 or any of the preceding or subsequent examples, wherein moving the at least one adjustable roller element relative to the rail member comprises moving the at least one adjustable roller element in a direction substantially perpendicular to a longitudinal axis of the rail member.

Example 19. The method of Example 15 or any of the preceding or subsequent examples, further comprising applying a moving force to the carriage assembly that overcomes a static friction between the carriage assembly and the rail member to move the carriage assembly along the rail member.

Example 20. The method of Example 19 or any of the preceding examples, further comprising: removing the moving force from the carriage assembly; and maintaining the carriage assembly at a location along the rail member where the moving force is removed due to the static friction between the carriage assembly and the rail member.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An adjustable friction slider assembly comprising:
    a rail member; and
    a carriage assembly moveably coupled to the rail member, the carriage assembly comprising:
        a bracket member; and
        a plurality of roller elements moveably coupled to the rail member and coupled to the bracket member using a plurality of attachment members, the plurality of roller elements comprising at least one adjustable roller element coupled to the bracket member using a moveable attachment member,
        wherein moving the moveable attachment member adjusts a friction between the plurality of roller elements and the rail member.

2. The adjustable friction slider assembly of claim 1, further comprising a moveable sub-assembly coupled to the bracket member, wherein the friction is adjusted based on the moveable sub-assembly.

3. The adjustable friction slider assembly of claim 2, wherein the moveable sub-assembly comprises a headrest, a video monitor, a tray table, or a portable electronic device holder.

4. The adjustable friction slider assembly of claim 1, wherein the friction comprises a static friction that causes the carriage assembly to maintain a position along the rail member.

5. The adjustable friction slider assembly of claim 4, wherein a moving force that overcomes the static friction is applied to the carriage assembly to move the carriage assembly along the rail member.

6. The adjustable friction slider assembly of claim 1, wherein the rail member comprises a longitudinal axis, and the at least one adjustable roller element is moveable in a direction substantially perpendicular to the longitudinal axis.

7. The adjustable friction slider assembly of claim 1, wherein the carriage assembly further comprises a friction adjustment member coupled to the moveable attachment member and moving the friction adjustment member adjusts the friction between the plurality of roller elements and the rail member.

8. A passenger seat comprising an adjustable friction slider assembly comprising:
    a rail member coupled to the passenger seat; and
    a carriage assembly moveably coupled to the rail member, the carriage assembly comprising:
        a bracket member; and
        a plurality of roller elements moveably coupled to the rail member and coupled to the bracket member using a plurality of attachment members, the plurality of roller elements comprising at least one adjustable roller element coupled to the bracket member using a moveable attachment member,
        wherein moving the moveable attachment member adjusts a friction between the plurality of roller elements and the rail member.

9. The passenger seat of claim 8, further comprising a moveable sub-assembly coupled to the bracket member, wherein the friction is adjusted based on the moveable sub-assembly.

10. The passenger seat of claim 9, wherein the moveable sub-assembly comprises a headrest, a video monitor, a tray table, or a portable electronic device holder.

11. The passenger seat of claim 8, wherein the friction comprises a static friction that causes the carriage assembly to maintain a position along the rail member.

12. The passenger seat of claim 11, wherein a moving force that overcomes the static friction is applied to the carriage assembly to move the carriage assembly along the rail member.

13. The passenger seat of claim 8, wherein the rail member comprises a longitudinal axis, and the at least one adjustable roller element is moveable in a direction substantially perpendicular to the longitudinal axis.

14. The passenger seat of claim 8, wherein the carriage assembly further comprises a friction adjustment member coupled to the moveable attachment member and moving the friction adjustment member adjusts the friction between the plurality of roller elements and the rail member.

15. A method for adjusting a friction of an adjustable friction slider assembly comprising:
    coupling a carriage assembly to a rail member, the carriage assembly comprising a plurality of roller elements, the plurality of roller elements comprising at least one adjustable roller element; and
    moving the at least one adjustable roller element relative to the rail member to adjust the friction between the plurality of roller elements and the rail member.

16. The method of claim 15, wherein the friction is adjusted based on a moveable sub-assembly coupled to the carriage assembly.

17. The method of claim 15, wherein moving the at least one adjustable roller element comprises moving a moveable attachment member, and wherein the moveable attachment member couples the at least one adjustable roller element to the carriage assembly.

18. The method of claim 15, wherein moving the at least one adjustable roller element relative to the rail member comprises moving the at least one adjustable roller element in a direction substantially perpendicular to a longitudinal axis of the rail member.

19. The method of claim 15, further comprising applying a moving force to the carriage assembly that overcomes a static friction between the carriage assembly and the rail member to move the carriage assembly along the rail member.

20. The method of claim 19, further comprising:
removing the moving force from the carriage assembly; and
maintaining the carriage assembly at a location along the rail member where the moving force is removed due to the static friction between the carriage assembly and the rail member.

* * * * *